(12) United States Patent
Maro et al.

(10) Patent No.: US 11,713,775 B2
(45) Date of Patent: Aug. 1, 2023

(54) AGRICULTURAL IMPLEMENTS AND HYDRAULIC CIRCUITS THEREFOR INCORPORATING ONE OR MORE PRIORITY VALVES

(71) Applicant: Deere & Company, Moline, IL (US)

(72) Inventors: Randall A. Maro, Davenport, IA (US); Aaron L. Barfels, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 48 days.

(21) Appl. No.: 17/388,374

(22) Filed: Jul. 29, 2021

(65) Prior Publication Data
US 2022/0056931 A1 Feb. 24, 2022

Related U.S. Application Data
(60) Provisional application No. 63/066,918, filed on Aug. 18, 2020.

(51) Int. Cl.
*F15B 11/16* (2006.01)
*A01B 63/32* (2006.01)
(Continued)

(52) U.S. Cl.
CPC ............ *F15B 11/162* (2013.01); *A01B 63/32* (2013.01); *A01B 49/027* (2013.01); *A01B 63/10* (2013.01);
(Continued)

(58) Field of Classification Search
CPC ............ F15B 11/162; F15B 2211/3059; F15B 2211/40515; F15B 2211/413;
(Continued)

(56) References Cited

U.S. PATENT DOCUMENTS 5,209,063 A * 5/1993 Shirai ................ E02F 9/22
60/422
5,950,429 A * 9/1999 Hamkins ............ F15B 11/162
60/426
(Continued)

FOREIGN PATENT DOCUMENTS

DE 19912299 A1 9/2000
EP 0926349 A2 6/1999
(Continued)

OTHER PUBLICATIONS

Extended European Search Report and Written Opinion issued in European Patent Application No. 21191285.2, dated Jan. 12, 2022, in 9 pages.

*Primary Examiner* — Dustin T Nguyen
(74) *Attorney, Agent, or Firm* — Taft Stettinius & Hollister LLP; Stephen F. Rost (57) ABSTRACT

Agricultural implements and hydraulic circuits for agricultural implements are disclosed herein. An agricultural implement includes a fluid source, a plurality of fluid demand devices, a delivery control valve, and a priority valve. The fluid source is configured to supply hydraulic fluid. The plurality of fluid demand devices are each configured to receive hydraulic fluid supplied by the fluid source during operation of the agricultural implement. The delivery control valve is fluidly coupled between the fluid source and a first fluid demand device. The delivery control valve is configured to selectively deliver hydraulic fluid supplied by the fluid source to the first fluid demand device during operation of the agricultural implement. The priority valve is fluidly coupled between the delivery control valve and the first fluid demand device.

15 Claims, 4 Drawing Sheets

(51) Int. Cl.
*A01B 63/10* (2006.01)
*A01B 49/02* (2006.01)

(52) U.S. Cl.
CPC .......... *F15B 2211/3059* (2013.01); *F15B 2211/40515* (2013.01); *F15B 2211/413* (2013.01); *F15B 2211/41527* (2013.01); *F15B 2211/428* (2013.01); *F15B 2211/7058* (2013.01); *F15B 2211/7135* (2013.01); *F15B 2211/781* (2013.01)

(58) Field of Classification Search
CPC ...... F15B 2211/41527; F15B 2211/428; F15B 2211/7058; F15B 2211/7135; F15B 2211/781; A01B 63/32; A01B 63/10; A01B 49/027
See application file for complete search history.

(56) References Cited

U.S. PATENT DOCUMENTS

| | | | | |
|---|---|---|---|---|
| 6,026,730 | A * | 2/2000 | Yoshida | F15B 11/162 |
| | | | | 91/461 |
| 10,539,162 | B2 * | 1/2020 | Horii | E02F 9/2225 |
| 11,131,080 | B2 * | 9/2021 | Aoki | E02F 9/2228 |
| 2004/0016556 | A1 | 1/2004 | Barber | |
| 2007/0204582 | A1 | 9/2007 | Goers et al. | |
| 2013/0299601 | A1 | 11/2013 | Ballu | |
| 2017/0274930 | A1 * | 9/2017 | Zhang | F15B 13/025 |
| 2018/0142445 | A1 | 5/2018 | Brandt et al. | |

FOREIGN PATENT DOCUMENTS

| | | |
|---|---|---|
| EP | 1273216 A1 | 1/2003 |
| EP | 3184827 A1 | 6/2017 |
| EP | 3213614 B1 | 8/2019 |
| GB | 1240193 A | 7/1971 |
| WO | 2012125109 A1 | 9/2012 |
| WO | 2012167258 A1 | 12/2012 |
| WO | WO 2019/066111 A1 | 4/2019 |

* cited by examiner

AGRICULTURAL IMPLEMENTS AND HYDRAULIC CIRCUITS THEREFOR INCORPORATING ONE OR MORE PRIORITY VALVES

CROSS-REFERENCE TO RELATED APPLICATION(S)

The present application claims priority to, and the benefit of, U.S. Provisional Patent Application Ser. No. 63/066,918 entitled "AGRICULTURAL IMPLEMENTS AND HYDRAULIC CIRCUITS THEREFOR INCORPORATING ONE OR MORE PRIORITY VALVES," which was filed on Aug. 18, 2020. That application is incorporated by reference herein in its entirety.

FIELD OF THE DISCLOSURE

The present disclosure relates, generally, to agricultural implements adapted for use with one or more work machines, and, more particularly, to hydraulic circuits for such agricultural implements.

BACKGROUND OF THE DISCLOSURE

Some hydraulic systems for agricultural equipment incorporate various fluid subsystems that consume various amounts of hydraulic fluid in use thereof. In some situations, to meet the fluid demand(s) of one or more fluid subsystem(s), it may be desirable to prioritize the supply of hydraulic fluid to one or more subsystems over the supply of hydraulic fluid to one or more other subsystems. Existing hydraulic circuit components employed to prioritize the supply of hydraulic fluid have a number of drawbacks. Accordingly, devices and/or systems for prioritizing the supply of hydraulic fluid that avoid those drawbacks remain an area of interest.

SUMMARY

The present disclosure may comprise one or more of the following features and combinations thereof.

According to one aspect of the present disclosure, an agricultural implement may include a fluid source, a plurality of fluid demand devices, a delivery control valve, and a priority valve. The fluid source may be configured to supply hydraulic fluid. Each of the plurality of fluid demand devices may be configured to receive hydraulic fluid supplied by the fluid source during operation of the agricultural implement. The delivery control valve may be fluidly coupled between the fluid source and a first fluid demand device. The delivery control valve may be configured to selectively deliver hydraulic fluid supplied by the fluid source to the first fluid demand device during operation of the agricultural implement. The priority valve may be fluidly coupled between the delivery control valve and the first fluid demand device. The priority valve may be configured to selectively restrict delivery of hydraulic fluid to the first fluid demand device by the delivery control valve to address a hydraulic fluid demand of a second higher priority fluid demand device during operation of the agricultural implement.

In some embodiments, the first fluid demand device may include a hydraulically-operated double-acting cylinder and the second fluid demand device may include a hydraulically-operated motor. Additionally, in some embodiments, the priority valve may include an inlet fluidly coupled to the delivery control valve, an outlet fluidly coupled to the first fluid demand device, and a spool movable between an open position, in which the inlet and the outlet are fluidly coupled to one another to permit delivery of hydraulic fluid from the delivery control valve to the first fluid demand device, and a closed position, in which the inlet and the outlet are fluidly de-coupled from another to resist delivery of hydraulic fluid from the delivery control valve to the first fluid demand device.

In some embodiments, the priority valve may include a first pressure signal port configured to apply a first pressure to a first end of the spool and a second pressure signal port configured to apply a second pressure to a second end of the spool in opposition to the first pressure applied to the first end of the spool, and movement of the spool between the open and closed positions may be at least partially dependent on a difference between the first and second pressures. The first pressure applied at the first pressure signal port may be indicative of an operational load and/or a hydraulic fluid demand associated with the second fluid demand device, and the second pressure applied at the second pressure signal port may be indicative of an actual pressure supplied to the second fluid demand device.

In some embodiments, the priority valve may be configured for movement from the open position to the closed position when the difference between the first and second pressures falls below a reference threshold. Additionally, in some embodiments, the agricultural implement may further include a compensator valve fluidly coupled to the second fluid demand device, and the compensator valve may include first and second compensator ports that are fluidly coupled to the respective first and second pressure signal ports to at least partially control the difference between the first and second pressures. A flow control valve may be fluidly coupled between the compensator valve and the second fluid demand device. One of the first and second pressures may correspond to a pressure supplied to an inlet of the compensator valve and the other of the first and second pressures may correspond to a pressure supplied from an outlet of the flow control valve.

According to another aspect of the present disclosure, a hydraulic circuit for an agricultural implement may include a fluid source, a fluid demand subsystem, a delivery control valve, and a priority valve. The fluid source may be configured to supply hydraulic fluid. The fluid demand subsystem may be configured to receive hydraulic fluid supplied by the fluid source during operation of the hydraulic circuit. The delivery control valve may be fluidly coupled between the fluid source and the fluid demand subsystem. The delivery control valve may be configured to selectively deliver hydraulic fluid supplied by the fluid source to the fluid demand subsystem during operation of the hydraulic circuit. The priority valve may be fluidly coupled between the delivery control valve and the fluid demand subsystem. The priority valve may be configured to selectively restrict delivery of hydraulic fluid to the fluid demand subsystem by the delivery control valve to address a hydraulic fluid demand of another higher priority fluid demand subsystem during operation of the hydraulic circuit. The priority valve may be configured to selectively restrict delivery of hydraulic fluid to the fluid demand subsystem by the delivery control valve in a proportional manner to optimize performance of the fluid demand subsystem.

In some embodiments, the fluid demand subsystem may include a hydraulically-operated double-acting cylinder and the another higher priority fluid demand subsystem may include a hydraulically-operated motor. Additionally, in some embodiments, the priority valve may include an inlet fluidly coupled to the delivery control valve, an outlet fluidly coupled to the fluid demand subsystem, and a spool movable between an open position, in which the inlet and the outlet are fluidly coupled to one another to permit delivery of hydraulic fluid from the delivery control valve to the fluid demand subsystem, and a closed position, in which the inlet and the outlet are fluidly de-coupled from another to resist delivery of hydraulic fluid from the delivery control valve to the fluid demand subsystem.

In some embodiments, the priority valve may include a first pressure signal port configured to apply a first pressure to a first end of the spool and a second pressure signal port configured to apply a second pressure to a second end of the spool in opposition to the first pressure applied to the first end of the spool, the first pressure applied at the first pressure signal port may be indicative of an operational load and/or a hydraulic fluid demand associated with the another higher priority fluid demand subsystem, and the second pressure applied at the second pressure signal port may be indicative of an actual pressure supplied to the another higher priority fluid demand subsystem. The priority valve may be configured for movement from the open position to the closed position when the difference between the first and second pressures falls below a reference threshold. Additionally, in some embodiments, the hydraulic circuit may further include a compensator valve fluidly coupled to the another higher priority fluid demand subsystem, and the compensator valve may include first and second compensator ports that are fluidly coupled to the respective first and second pressure signal ports to at least partially control the difference between the first and second pressures. The hydraulic circuit may further include a flow control valve fluidly coupled between the compensator valve and the another higher priority fluid demand subsystem.

According to yet another aspect of the present disclosure, a priority valve for a hydraulic circuit including a fluid source, a fluid demand subsystem fluidly coupled to the fluid source, and a delivery control valve fluidly coupled between the fluid source and the fluid demand subsystem and configured to selectively deliver hydraulic fluid supplied by the fluid source to the fluid demand subsystem during operation of the hydraulic circuit may include a spool, a first pressure signal port, and a second pressure signal port. The spool may have a first end and a second end arranged opposite the first end. The first pressure signal port may be configured to apply a first pressure to the first end of the spool. The second pressure signal port may be configured to apply a second pressure to the second end of the spool in opposition to the first pressure applied to the first end of the spool. The priority valve may be configured to selectively restrict delivery of hydraulic fluid to the fluid demand subsystem by the delivery control valve to address a hydraulic fluid demand of another higher priority fluid demand subsystem of the hydraulic circuit during operation thereof. The first and second pressures may be established with reference to the another higher priority fluid demand subsystem of the hydraulic circuit.

In some embodiments, the first pressure applied at the first pressure signal port may be indicative of an operational load and/or a hydraulic fluid demand associated with the another higher priority fluid demand subsystem, and the second pressure applied at the second pressure signal port may be indicative of an actual pressure supplied to the another higher priority fluid demand subsystem. Additionally, in some embodiments, the priority valve may be configured for movement from an open position, in which an inlet of the priority valve and an outlet of the priority valve are fluidly coupled to one another to permit delivery of hydraulic fluid from the delivery control valve to the fluid demand subsystem during operation of the hydraulic circuit, to a closed position, in which the inlet and the outlet are fluidly de-coupled from another to resist delivery of hydraulic fluid from the delivery control valve to the fluid demand subsystem during operation of the hydraulic circuit, when the difference between the first and second pressures falls below a reference threshold. Further, in some embodiments still, the priority valve may be configured to selectively restrict delivery of hydraulic fluid to the fluid demand subsystem by the delivery control valve in a proportional manner to optimize performance of the fluid demand subsystem during operation of the hydraulic circuit.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

Figure 1:
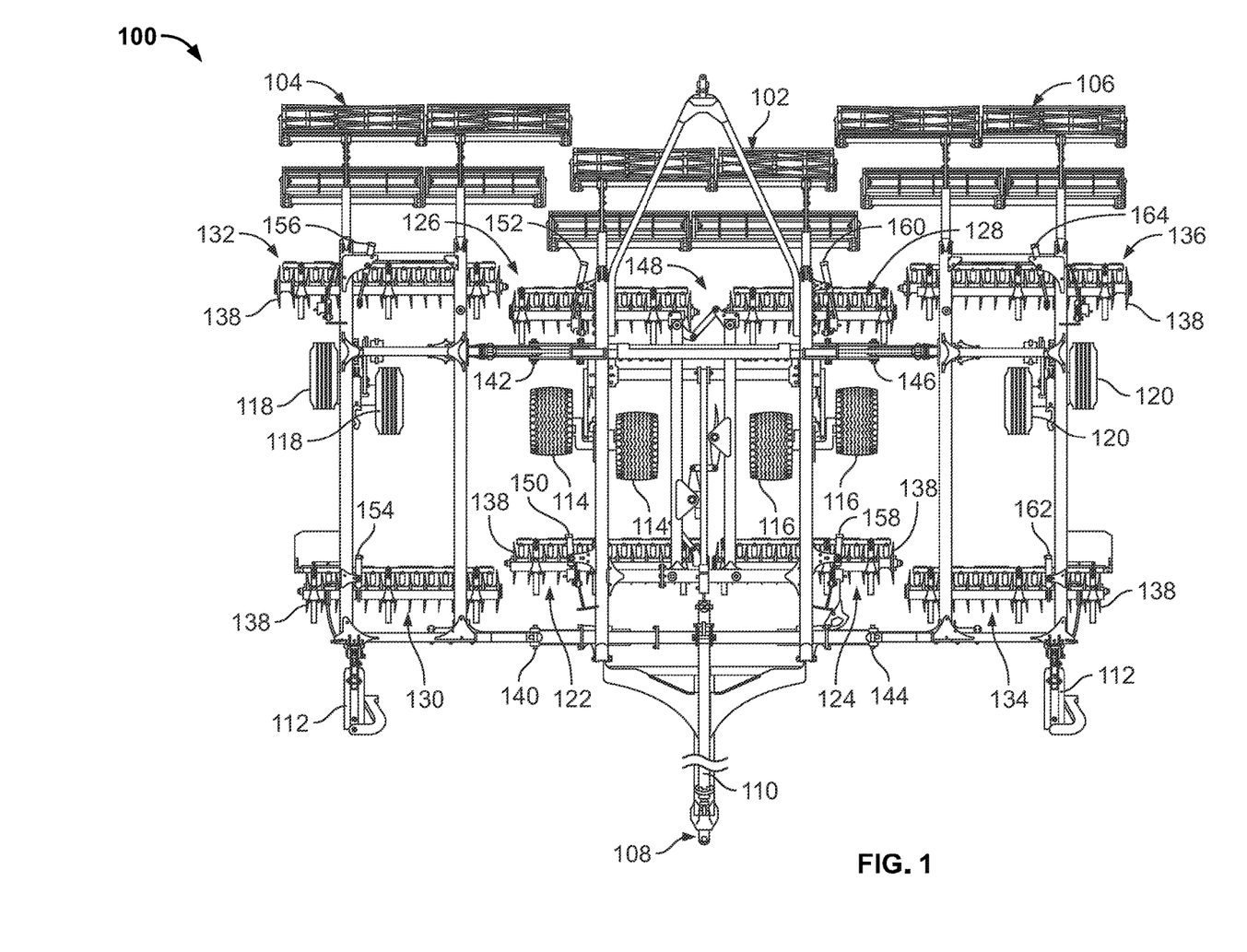
FIG. 1 is an elevated view of a multi-section agricultural implement.

Referring now to FIG. 1, an agricultural implement 100 such as a field cultivator is shown. The implement 100 is designed to couple to a work machine or tractor (not shown) and perform a work function. For example, the implement may include work tools that penetrate into soil for aerating the soil before planting or uprooting weeds after planting. The implement 100 may be attached to a work machine or tractor by a hitch assembly 108 such as a three-point hitch or a drawbar attachment. The hitch assembly 108 includes a hitch frame member 110 that extends longitudinally in a direction of travel for coupling to the work machine or tractor.

The agricultural implement 100 may include a transversely-extending frame that forms multiple frame sections. In FIG. 1, for example, the implement 100 includes a main or center frame 102. The main frame 102 is coupled to the hitch assembly 108 as shown. A first frame section 104 or first wing frame is disposed to one side of the main frame 102, and a second frame section or 106 or second wing frame is disposed to an opposite side thereof. Although not shown, a third frame section may be disposed to an outside of the first inner frame 104, and a fourth frame section may be disposed to an outside of the second inner frame 106.

Each frame section may be pivotally coupled to the frame section adjacent thereto. The first frame section 104, for example, may be pivotally coupled to the main frame 102 at a forward location via a first hinge 140 and at a rear location via a second hinge 142. Similarly, the second frame section 106 may be pivotally coupled to the main frame 102 at a forward location via a third hinge 144 and at a rear location via a fourth hinge 146. The different hinges may allow for the different frame sections to be raised to a folded, transport configuration, among other configurations.

The implement 100 may be supported by a plurality of wheels. For example, a pair of front wheels 112 are coupled to the frame at a front end thereof. The main frame 102 may be further supported by a first pair of wheels 114 and a second pair of wheels 116. The first frame section 104 may be supported by a third pair of wheels 118 and the second frame section 106 may be supported by a fourth pair of wheels 120. While each section is shown as being supported by a different pair of wheels in the illustrative configuration, it should be appreciated that other configurations may be employed. In some embodiments, for example, each frame section may be supported by a single wheel. Additionally, in some embodiments, each frame section may be supported by more than one pair of wheels. Moreover, the implement 100 may include wheels in addition to the front wheels 112, such as back wheels disposed near the rear of the implement 100 for additional support, for example.

In the illustrative embodiment of FIG. 1, each frame section 102, 104, 106 is capable of supporting at least two gang assemblies. The main frame 102, for example, supports a pair of front gang assemblies and a pair of rear gang assemblies. As shown, the pair of front gang assemblies may include a first main frame front gang assembly 122 and a second main frame front gang assembly 124. Likewise, the pair of rear gang assemblies may include a first main frame rear gang assembly 126 and a second main frame rear gang assembly 128. The first frame section 104 may include a front gang assembly 130 and a rear gang assembly 132, and the second frame section 106 may include a front gang assembly 134 and a rear gang assembly 136. In some embodiments, the first and second frame sections 104, 106 may include a pair of front and rear gang assemblies. In any case, each gang assembly includes work tools 138, such as discs or coulters, for example, which are capable of breaking up soil. The tools 138 are arranged in a spaced-apart relationship relative to one another.

In the illustrative embodiment of FIG. 1, the agricultural implement 100 may include a plurality of actuators for controlling an angle at which the gang assemblies are oriented, which may be referred to as the gang angle of each gang assembly. Each actuator may be a hydraulic actuator, electric actuator, or any other known actuator. Moreover, each actuator may include an outer body or cylinder in which a rod or piston moves between an extended position and a retracted position. For the purposes of the present disclosure, it should be appreciated that the actuators may be similar in size in that the cylinder bore and stroke length may be the same.

As depicted in FIG. 1, the main frame 102 includes a first front actuator 150 for controlling the gang angle of the first main frame front gang assembly 122, a first rear actuator 152 for controlling the gang angle of the first main frame rear gang assembly 126, a second front actuator 158 for controlling the gang angle of the second main frame front gang assembly 124, and a second rear actuator 160 for controlling the gang angle of the second main frame rear gang assembly 128. The first frame section 104 may include a front actuator 154 for controlling the gang angle of the front gang assembly 130 and a rear actuator 156 for controlling the gang angle of the rear gang assembly 132. Likewise, the second frame section 106 may include a front actuator 162 for controlling the gang angle of the front gang assembly 134 and a rear actuator 164 for controlling the gang angle of the rear gang assembly 136.

In the illustrative embodiment, the implement 100 may include a gang linkage 148 that couples the pair of rear gang assemblies 126, 128 to one another to permit synchronous angular movement and/or adjustment of the assemblies 126, 128 in use thereof. In other words, as the gang angle of the first main frame rear gang assembly 126 changes, the gang angle of the second main frame rear gang assembly 128 changes therewith due to the interconnection established by the gang linkage 148. As a result, the gang linkage 148 essentially ensures that the side-to-side gang assemblies are maintained at approximately the same gang angle at all times. The illustrative gang linkage 148 is embodied as, or otherwise includes, a mechanical linkage having a plurality of components (e.g., links, beams, rods, brackets, pivots, pins, etc.) configured for interaction with one another (e.g., translational movement, pivotal movement, etc.) to permit substantially synchronous angular movement and/or adjustment of the assemblies 126, 128 as discussed above. Of course, it should be appreciated that in other embodiments, the gang linkage 148 may be embodied as, or otherwise include, another suitable linkage, such as an electric, hydraulic, or electro-hydraulic linkage, for example.

It should be appreciated that an electronic control system may be used to control the agricultural implement 100, which may be pulled by a work machine that includes a frame or chassis supported by a plurality of ground-engaging mechanisms (not shown) such as wheels. An operator's cab (not shown) may be mounted to the frame and an operator may control the work machine and the implement 100 therefrom. To do so, the work machine may include a plurality of controls (not shown) such as joysticks, levers, switches, knobs, a steering wheel, pedals, and the like. A controller (e.g., the controller 210 shown in FIG. 2) may be communicatively coupled to the plurality of controls, and the controller may control the functionality of the work machine and the implement 100. In one example, the operator may operably control the gang linkage 148 in order to adjust gang angle from the cab.

Additionally, it should be appreciated that a user interface (not shown) may be disposed in the operator's cab. The user interface may include a display (not shown) for displaying various characteristics of the work machine such as, but not limited to, speed, fluid temperatures, fluid pressures, direction of travel, etc. The display may be a touchscreen display that allows the operator to control certain functions of the work machine and the implement (e.g., gang linkage 148) by touching a button on the display. Of course, it should be appreciated that the user interface may be used for other purposes (e.g., controlling the implement 100 in conjunction with the controller), and the present disclosure is not intended to be limited in any way with respect to the functionality of the operator controls or user interface.

Figure 2:
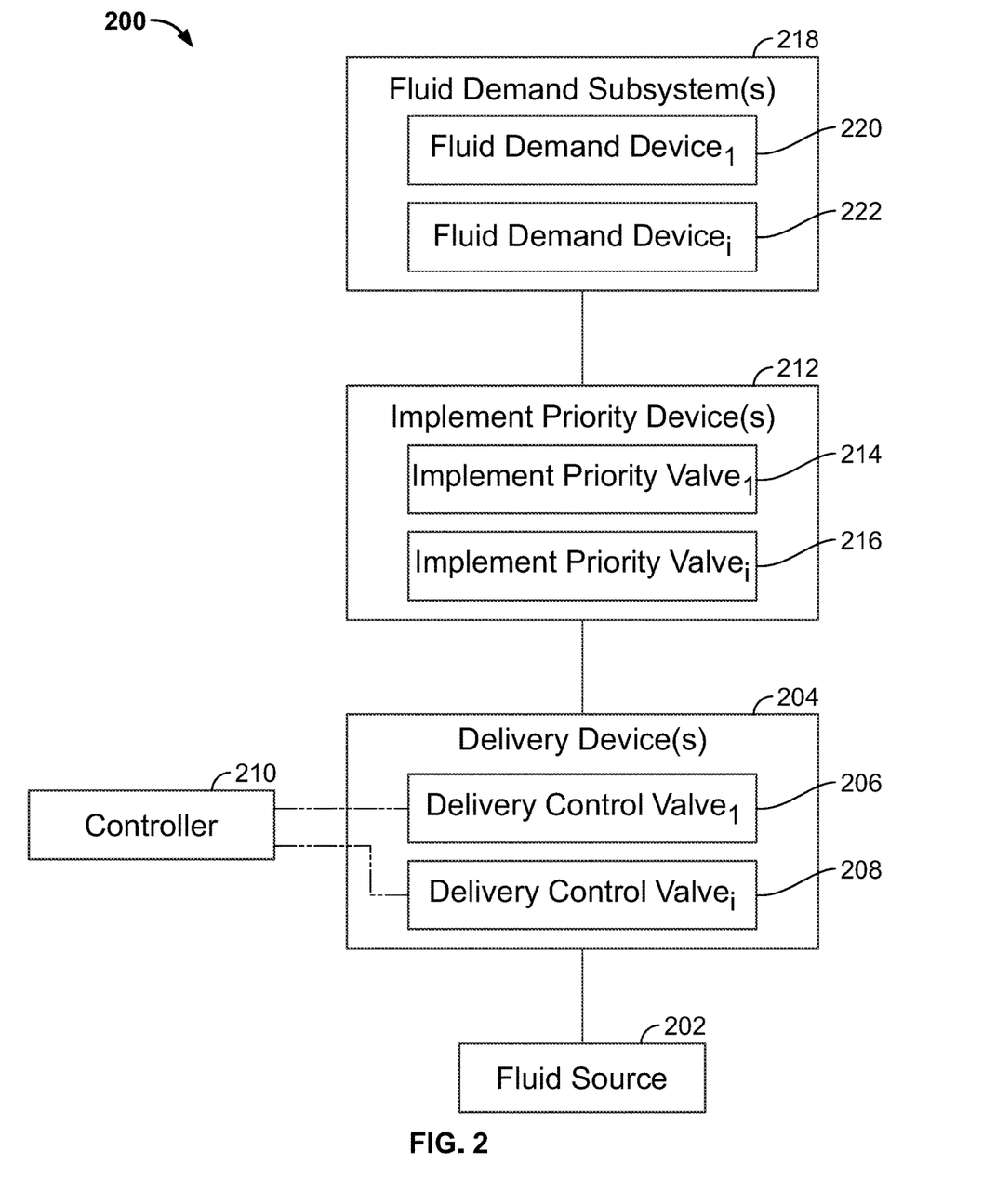
FIG. 2 is a simplified diagrammatic view of a hydraulic circuit adapted for use with the agricultural implement of FIG. 1.

Referring now to FIG. 2, an illustrative hydraulic circuit 200 included in, or otherwise adapted for use with, the agricultural implement 100 may be used to control one or more operational characteristics of the implement 100. Those operational characteristics may include, but are not limited to, the gang angle of one or more gang assemblies, the position or stroke of one or more actuators, the penetration depth and/or position of one or more ground-engaging tools, the rotational speed of one or more ground-engaging tools, the discrete operational states and/or positions of one or more linkages, or the operational states of one or more drive units, motors, prime movers, valves, fluid displacement devices, or fluid demand devices, for example. In any case, in the illustrative embodiment, the hydraulic circuit 200 is configured to circulate, distribute, or otherwise provide, hydraulic fluid to a plurality of hydraulically-operated components, as will be apparent from the discussion that follows.

In the illustrative embodiment, the hydraulic circuit 200 includes a fluid source 202, one or more delivery device(s) 204, one or more implement priority device(s) 212, and one or more fluid demand subsystem(s) 218. The one or more fluid subsystem(s) 218 may be fluidly coupled to the fluid source 202 to receive hydraulic fluid therefrom. The one or more delivery device(s) 204 are fluidly coupled between the fluid source 202 and the one or more subsystem(s) 218, and the one or more implement priority device(s) 212 are fluidly coupled between the one or more delivery device(s) 204 and the one or more fluid demand subsystem(s) 218.

It should be appreciated that for the sake of simplicity and/or clarity, a number of components included in the hydraulic circuit 200 may not be depicted in the drawings or described herein. For example, in some embodiments, the hydraulic circuit 200 may include one or more regulator valves, check valves, orifices, restrictors, plenums, distribution circuits, solenoid valves, logic valves, pumps, lubrication circuits, cooling circuits, brakes, clutches, actuators, flow control valves, selective control valves, accumulators, or the like which are not depicted in the drawings or described herein. Nevertheless, it should be appreciated that those components may be used in conjunction with the devices illustratively depicted in FIG. 2 to control operation of the agricultural implement 100 using the hydraulic circuit 200.

In the illustrative embodiment, the fluid source 202 is configured to supply hydraulic fluid to the other components of the hydraulic circuit 200. The fluid source 202 may be located on the work machine or tractor or on the implement 100. In some embodiments, a hydraulic pump (e.g., the pump 302 shown in FIG. 3) may be embodied as, or otherwise include, the fluid source 202. Additionally, in some embodiments, a fluid tank or reservoir (not shown) fluidly coupled to the fluid source 202 may be used to store fluid for the implement 200.

The illustrative one or more delivery device(s) 204 include at least one delivery control valve or selective control valve (SCV) 206 that is fluidly coupled to the fluid source 202. In some embodiments, the device(s) 204 may include multiple delivery control valves 208 that are each fluidly coupled to the fluid source 202. For the purposes of the present disclosure, the number of delivery control valves included in the one or more delivery device(s) 204 may be any number from 1 to "i", where i is any positive integer. Of course, in configurations in which only the delivery control valve 206 is provided, the delivery control valve 208 (and the "i" designation attributed thereto) may be omitted.

In any case, each of the illustrative delivery control valves 206, 208 is configured to selectively deliver hydraulic fluid supplied by the fluid source 202 to at least one fluid demand device (e.g., at least one of the devices 220, 222) during operation of the hydraulic circuit 200. In the illustrative embodiment, each of the valves 206, 208 is embodied as, or otherwise includes, an electro-hydraulic control valve that is responsive to control signals provided by the controller 210 to deliver hydraulic fluid to at least one fluid demand device in a selective manner. In doing so, each of the valves 206, 208 may open (e.g., to deliver fluid) or close (e.g., to restrict delivery of fluid) in response to control signals provided by the controller 210. In some embodiments, one or more of the valves 206, 208 may be biased (e.g., by a spring element) to an open position and thus referred to as a normally open control valve. In other embodiments, one or more of the valves 206, 208 may be biased to a closed position and thus referred to as a normally closed control valve.

The illustrative one or more implement priority device(s) 212 include at least one implement priority valve (IPV) 214 that is fluidly coupled between the one or more delivery device(s) 204 and the one or more fluid demand subsystem(s) 218. In some embodiments, the device(s) 212 may include multiple implement priority valves 216 that are each fluidly coupled between the one or more delivery device(s) 204 and the one or more fluid demand subsystem(s) 218. For the purposes of the present disclosure, the number of implement priority valves included in the one or more implement priority device(s) 212 may be any number from 1 to "i", where i is any positive integer. Of course, in configurations in which only the implement priority valve 214 is provided, the implement priority valve 216 (and the "i" designation attributed thereto) may be omitted.

Regardless, each of the illustrative implement priority valves 214, 216 is configured to selectively restrict delivery of hydraulic fluid to at least one fluid demand device (e.g., at least one of the devices 220, 222) by at least one delivery control valve (e.g., at least one of the valves 206, 208) during operation of the hydraulic circuit 200. In doing so, as discussed in greater detail below with reference to FIGS. 3 and 4, each of the implement priority valves 214, 216 addresses a hydraulic fluid demand of another higher priority fluid demand device and/or subsystem. For the purposes of the present disclosure, the hydraulic fluid demand of the another higher priority fluid demand device and/or subsystem is embodied as, or otherwise characterized by, a fluid shortage or fluid deficiency. In some embodiments, the restricted delivery of hydraulic fluid to one fluid demand device and/or subsystem (e.g., a "lower priority" fluid demand device and/or subsystem) may permit adequate fluid flow to another fluid demand device and/or subsystem (e.g., a "higher priority" fluid demand device and/or subsystem).

The illustrative one or more fluid demand subsystem(s) 218 include at least one fluid demand device 220 that is configured to receive hydraulic fluid supplied by the fluid source 202 during operation of the hydraulic circuit 200. In some embodiments, the subsystem(s) 218 may include multiple fluid demand devices 222 that are each configured to receive hydraulic fluid supplied by the fluid source 202 during operation of the hydraulic circuit 200. For the purposes of the present disclosure, the number of fluid demand devices included in the one or more fluid demand subsystem(s) 218 may be any number from 1 to "i", where i is any positive integer. Of course, in configurations in which only the fluid demand device 220 is provided, the fluid demand device 222 (and the "i" designation attributed thereto) may be omitted.

Figure 3:
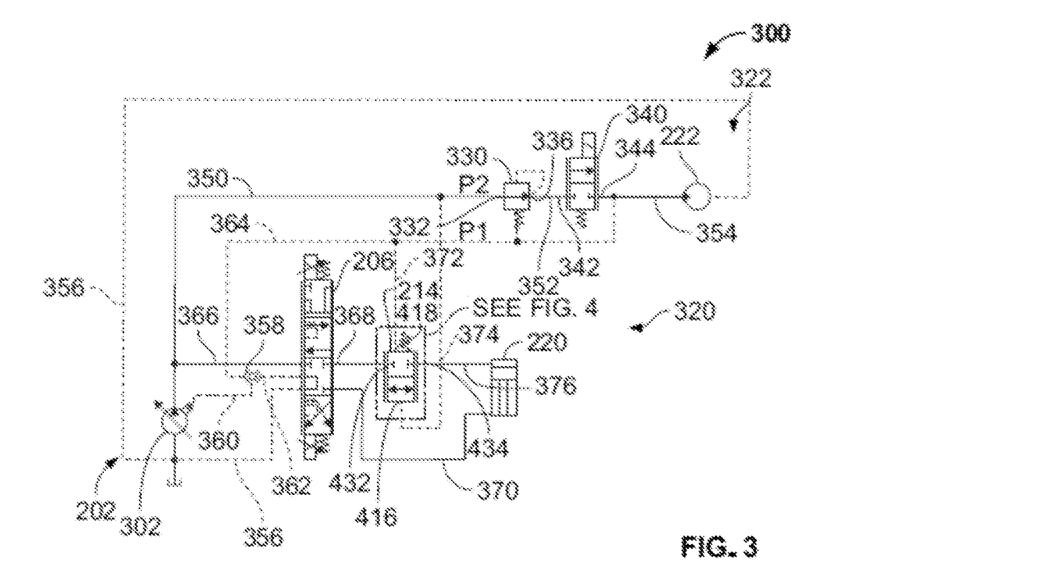
FIG. 3 is a schematic view of various components included in the hydraulic circuit diagrammatically depicted in FIG. 2.

Referring now to FIG. 3, an illustrative portion 300 of the hydraulic circuit 200 includes the pump or fluid source 302, the delivery control valve 206, the priority valve 214, one fluid demand device 220, and another fluid demand device 222, among other things as described below. The delivery control valve 206 is fluidly coupled between the fluid source 302 and the fluid demand device 220 and configured to selectively deliver hydraulic fluid supplied by the fluid source 302 to the device 220. The priority valve 214 is fluidly coupled between the delivery control valve 206 and the fluid demand device 220 and configured to selectively restrict delivery of hydraulic fluid to the device 220 by the valve 206 to address a hydraulic fluid demand of the fluid demand device 222 during operation of the hydraulic circuit 200. Thus, in the illustrative embodiment, the fluid demand device 220 may be referred to as a lower-priority fluid demand device, whereas the fluid demand device 222 may be referred to as a higher-priority fluid demand device.

It should be appreciated that for the purposes of the present disclosure, the separate fluid demand devices 220, 222 may be included in, form a portion of, or otherwise be adapted for use with, respective fluid demand subsystems 320, 322. Therefore, in the illustrative embodiment, the fluid demand subsystem 320 may be referred to as a lower-priority fluid demand subsystem, and the fluid demand subsystem 322 may be referred to as a higher-priority demand subsystem.

When delivery of hydraulic fluid to the fluid demand device 220 and the fluid demand subsystem 320 is restricted by the implement priority valve 214, flow control provided by the delivery control valve 206 may be said to be overridden by the priority valve 214 in use of the hydraulic circuit 200. Consequently, the priority valve 214 limits hydraulic fluid consumption by the fluid demand device 220 and the fluid demand subsystem 320 to provide adequate flow to the fluid demand device 222 and the fluid demand subsystem 322 in use of the hydraulic circuit 200. As described in greater detail below with reference to FIGS. 3 and 4, such restriction by the priority valve 214 is associated with, or otherwise corresponds to, application of fluid pressures P1, P2 to a spool 414 of the priority valve 214 that are established with reference to the higher priority fluid demand device 222 and the higher priority fluid demand subsystem 322.

In the illustrative embodiment, the fluid demand device 220 is embodied as, or otherwise includes, a hydraulically-operated double-acting cylinder. Of course, it should be appreciated that in other embodiments, the fluid demand device 220 may be embodied as, or otherwise include, another suitable device. Additionally, in the illustrative embodiment, the fluid demand device 222 is embodied as, or otherwise includes, a hydraulically-operated motor. Of course, it should be appreciated that in other embodiments, the fluid demand device 222 may be embodied as, or otherwise include, another suitable device.

In the illustrative embodiment, the portion 300 of the hydraulic circuit 200 includes a compensator valve 330 that is fluidly coupled to the fluid demand device 222 through a flow control valve 340. The compensator valve 330 has a first compensator port or inlet 332 that is fluidly coupled to a first pressure signal port 416 (see FIG. 4) of the priority valve 214 and a second compensator port 336 that is fluidly coupled to a second pressure signal port 418 of the priority valve 214. At least in some embodiments, due to the fluidic couplings between the compensator valve 330 and the priority valve 214, the compensator valve 330 at least partially controls the difference between the fluid pressures P1, P2, which are applied, respectively, to the ports 418, 416 of the priority valve 214 from the ports 336, 332 of the compensator valve 330. Thus, in those embodiments, the compensator valve 330 may be said to at least partially control movement of the spool 414 of the priority valve 214, and thereby delivery of hydraulic fluid to the fluid demand device 220.

The illustrative flow control valve 340 is fluidly coupled between the compensator valve 330 and the fluid demand device 222. The flow control valve 340 includes an inlet 342 that is fluidly coupled to the port 336 of the compensator valve 330 and an outlet 344 that is fluidly coupled to the fluid demand device 222. In at least some embodiments, the fluid pressure P1 corresponds to a pressure that is supplied from the outlet 344 of the flow control valve 340 and the fluid pressure P2 corresponds to a pressure that is supplied from the inlet 332 of the compensator valve 330.

The illustrative portion 300 of the hydraulic circuit 200 includes various fluidic interconnections. The pump 302 is fluidly coupled to the compensator valve 330 by a fluid line 350. The compensator valve 330 is fluidly coupled to the flow control valve 340 by a fluid line 352. The flow control valve 340 is fluidly coupled to the fluid demand device 222 by a fluid line 354. The fluid demand device 222 is fluidly coupled to the delivery control valve 206 by a fluid line 356. The pump 302 is fluidly coupled to a shuttle valve 358 by a fluid line 360. The shuttle valve 358 is fluidly coupled to the delivery control valve 206 by a fluid line 362 and to the fluid line 354 by a fluid line 364. The delivery control valve 206 is fluidly coupled to the fluid line 350 by a fluid line 366, to the priority valve 214 by a fluid line 368, and to the fluid demand device 220 by a fluid line 370. The priority valve 214 is fluidly coupled to the fluid line 364 by a fluid line 372, to the fluid line 350 by a fluid line 374, and to the fluid demand device 220 by a fluid line 376.

Figure 4:
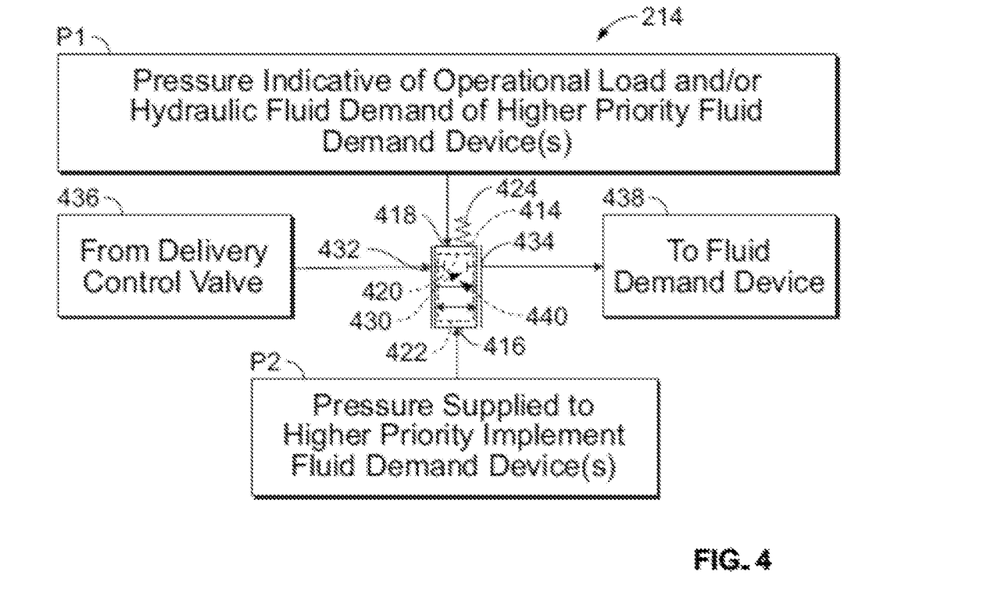
FIG. 4 is a detail view of one of the components shown in FIG. 3.

Referring now to FIG. 4, in the illustrative embodiment, the fluid pressure P1 received at the second pressure signal port 418 is applied to an end 420 of the spool 414 to urge the spool 414 in a first direction. The fluid pressure P2 received at the first pressure signal port 416 is applied to an end 422 of the spool 414 arranged opposite the end 420 to urge the spool 414 in a second direction opposite the first direction. A spring element 424 illustratively applies a biasing force to the end 420 to bias the spool 414 in the first direction.

It should be appreciated that during operation of the hydraulic circuit 200, movement of the spool 414 of the priority valve 214 is dependent upon the fluid pressure P1 applied to the end 420, the fluid pressure P2 applied to the end 422, and the bias applied to the end 420 by the spring element 424. In the illustrative embodiment, the spool 414 is movable between an open position 430 and a closed position 440. When the spool 414 is in the open position 430, an inlet 432 of the priority valve 214 is fluidly coupled to an outlet 434 of the priority valve 214. As such, when the spool 414 is in the open position 430, hydraulic fluid delivered from the delivery control valve 206 to the inlet 432 (i.e., as indicated by block 436) is provided to the fluid demand device 220 (i.e., as indicated by block 438) from the outlet 434. When the spool 414 is in the closed position 440, the inlet 432 and the outlet 434 are fluidly de-coupled from one another to resist delivery of hydraulic fluid to the fluid demand device 220 from the delivery control valve 206 through the priority valve 214.

In the illustrative embodiment, the fluid pressure P1 is indicative of an operational load and/or a hydraulic fluid demand associated with the fluid demand device 222. For the purposes of the present disclosure, the fluid pressure P1 may be referred to as a load sense pressure associated with the fluid demand device 222. It should be appreciated that prior to operation/activation of the fluid demand device 222, the load sense pressure P1 may have a substantially non-appreciable value, such as substantially zero pressure, for example. It should also be appreciated that during operation/activation of the fluid demand device 222, the load sense pressure P1 may have an appreciable value. In any case, it should be appreciated that the load sense pressure P1 is established with reference to the higher priority fluid demand device 222 and the associated subsystem 322.

In the illustrative embodiment, the fluid pressure P2 is indicative of an actual pressure supplied to the fluid demand device 222 upon startup of the work machine or tractor that pulls the implement 100. For the purposes of the present disclosure, the fluid pressure P2 may be referred to as a standby pressure associated with the fluid demand device 222 that is separate from hydraulic fluid pressure demanded by the device 222 during operation thereof. It should be appreciated that the standby pressure P2 may have an appreciable value. In any case, it should be appreciated that the standby pressure P2 is established with reference to the higher priority fluid demand device 222 and the associated subsystem 322.

Upon startup of the work machine or tractor that pulls the implement 100, and prior to operation/activation of the fluid demand device 222, the standby pressure P2 is applied to the end 422 of the spool 414 and substantially no pressure is applied to the end 420 of the spool 414 by the load sense pressure P1. The standby pressure P2 counteracts the spring bias applied to the end 420 by the spring element 424 such that the spool 414 is in the open or fully open position 430. As a result, hydraulic fluid delivered by the delivery control valve 206 may be provided to the fluid demand device 220 through the priority valve 214 to drive operation of the device 220.

During operation/activation of the higher priority fluid demand device 222 and the associated subsystem 322, an appreciable pressure is applied to the end 420 of the spool 414 by the load sense pressure P1 while the standby pressure P2 is applied to the end 422. Consequently, the difference between the standby pressure P2 and the load sense pressure P1 decreases. When the difference between the standby pressure P2 and the load sense pressure P1 falls below a reference threshold, the spool 414 may move from the open position 430 to the closed position 440. As a result, the priority valve 214 may restrict hydraulic fluid delivery from the delivery control valve 206 to the lower priority fluid demand device 220 to address the hydraulic fluid demand of the higher priority fluid demand device 222.

It should be appreciated that the illustrative priority valve 214 is configured such that the spring bias applied by the spring element 424 to the spool 414 suffices to cause movement of the spool 414 from the open position 430 to the closed position 440 when the difference between the standby pressure P2 and the load sense pressure P1 falls below the reference threshold. In some embodiments, the configuration of the priority valve 214 (e.g., the setting of the spring bias of the spring element 424) may be based on the configuration of the compensator valve 330 (e.g., the low/high pressure setpoints thereof). More specifically, in some embodiments, the priority valve 214 and the compensator valve 330 may be configured such that the spring bias of the spring element 424 of the priority valve 214 is set slightly above the lowest pressure setting of the compensator valve 330.

In the illustrative embodiment, the priority valve 214 is configured to selectively restrict delivery of hydraulic fluid to the fluid demand device 220 and the associated subsystem 320 in a proportional manner to optimize performance of the device 220 and the subsystem 320. That is, the illustrative priority valve 214 is configured to restrict delivery of hydraulic fluid to the lower priority device 220 and subsystem 320 only to the extent necessary to satisfy the hydraulic fluid demand of the higher priority device 222 and subsystem 322. As a consequence of minimizing the restricted hydraulic fluid delivery in a proportional fashion, the overall performance of the hydraulic circuit and the devices and/or subsystems thereof may be optimized, at least in some embodiments.

Figure 5:
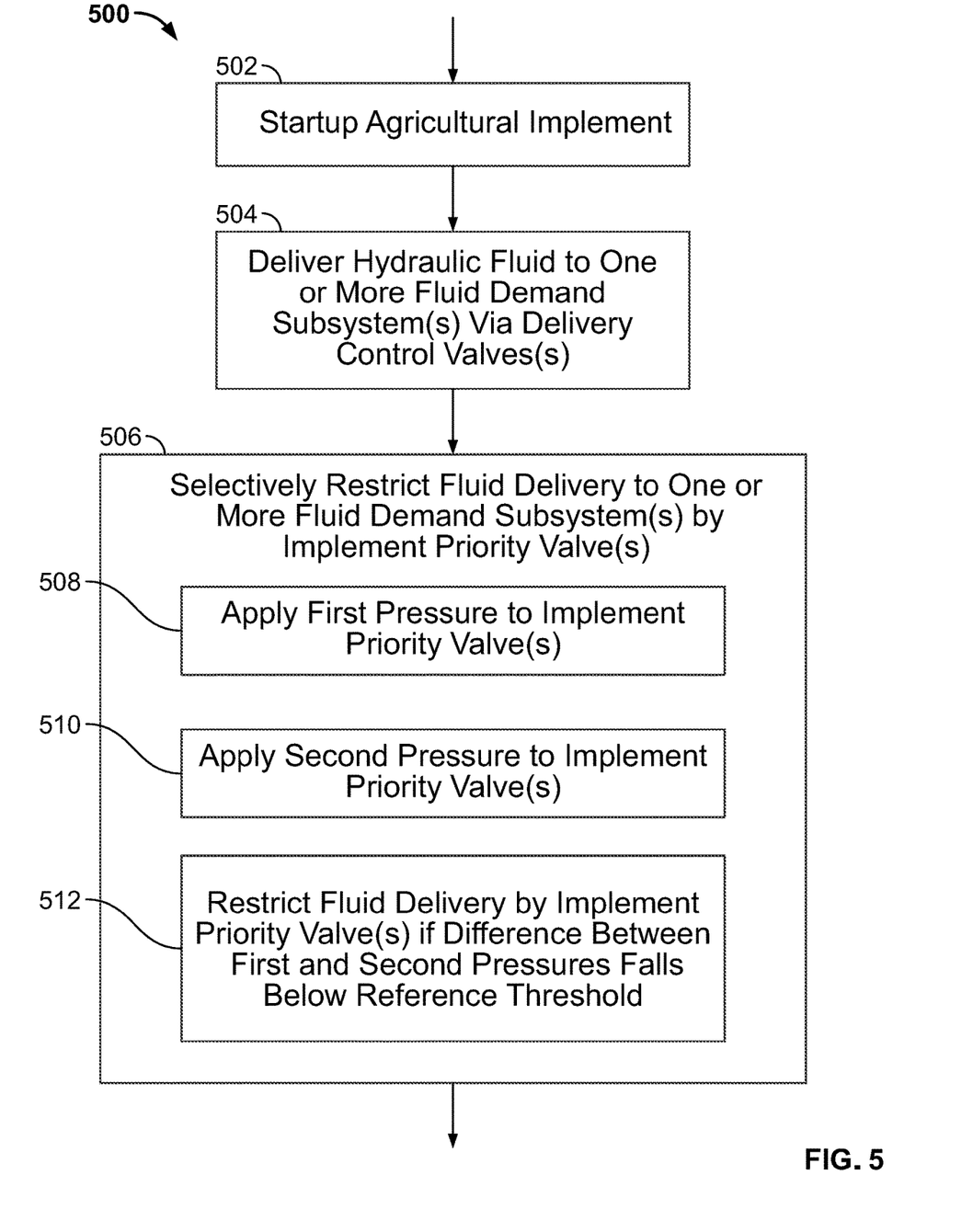
FIG. 5 is a simplified flowchart of a method of operating an agricultural implement such as the agricultural implement of FIG. 1.

Referring now to FIG. 5, an illustrative method 500 of operating the agricultural implement 100 may be performed manually (e.g., by a user) or automatically (e.g., by one or more components of the hydraulic circuit 200 individually, cooperatively, and/or under control by a controller such as the controller 210). The method 500 corresponds to, or is otherwise associated with, performance of the blocks described below in the illustrative sequence of FIG. 5. It should be appreciated, however, that the method 500 may be performed in one or more sequences different from the illustrative sequence.

The illustrative method begins with block 502. In block 502, startup of the implement 100 is performed. Of course, it should be appreciated that, at least in some embodiments, startup of the implement 100 in block 502 may include, or otherwise be embodied as, startup of the work machine or tractor that tows the implement 100 in use thereof. Furthermore, at least in some embodiments, it should be appreciated that block 502 may be performed using a dashboard or user interface of a control system. In any case, from block 502, the method 500 subsequently proceeds to block 504.

In block 504 of the illustrative method 500, hydraulic fluid is delivered to one or more fluid demand subsystem(s) 218 via the one or more delivery device(s) 204. In one embodiment, block 504 may include, or otherwise be embodied as, delivery of hydraulic fluid to the fluid demand device 220 and the associated subsystem 320 via the delivery control valve 206. Of course, it should be appreciated that in other embodiments, block 504 may include, or otherwise be embodied as, delivery of hydraulic fluid to another one of the subsystem(s) 218 via another one of the delivery device(s) 204. In any case, from block 504, the method 500 subsequently proceeds to block 506.

In block 506 of the illustrative method 500, hydraulic fluid delivery to one or more fluid demand subsystem(s) 218 is selectively restricted by the one or more implement priority device(s) 212. In the illustrative embodiment, block 506 includes, or is otherwise embodied as, selective restriction of hydraulic fluid delivery to the fluid demand device 220 and the associated subsystem 320 by the priority valve 214. In the illustrative embodiment, block 506 includes performance of blocks 508, 510, 512.

In block 508 of the illustrative method 500, the load sense pressure P1 is applied to the spool 414 of the illustrative priority valve 214. In block 510 of the illustrative method 500, the standby pressure P2 is applied to the spool 414 which counteracts the load sense pressure P1 applied to the spool 414 and the spring bias applied to the spool 414 by the spring element 424. In block 512 of the illustrative method 500, hydraulic fluid delivery to the fluid demand device 220 and the associated subsystem 320 is restricted by the priority valve 214 if the difference between the standby pressure P2 and the load sense pressure P1 falls below the reference threshold (i.e., such that the spool 414 moves from the open position 430 to the closed position 440).

The present disclosure may provide a number of configurations for an implement priority valve (e.g., the priority valve 214). It should be appreciated that each envisioned configuration may include, or otherwise be associated, an evaluation of hydraulic fluid delivery to one or more circuit(s) using one or more delivery device(s) (e.g., the delivery control valve 206) to determine how to prioritize fluid flow to the one or more circuit(s). In some cases, that evaluation may involve the identification of one or more high flow circuit(s) to which flow may be reduced to allow flow to other circuits and/or functions within minimal impact to overall performance. Additionally, due to bi-directional flow through the one or more delivery device(s), that evaluation may involve a determination as to the proper placement for the priority valve.

In some instances, insufficient hydraulic power may be caused by, or otherwise associated with, engine speed reduction of a tractor or work machine. In some configurations that incorporate a priority device, when the operation and/or rotational speed of a function restricted by the priority device is not acceptable, an operator may increase the engine speed of the tractor or work machine. Because the restricted function is typically a lower priority function, however, the impact to overall machine performance may be somewhat insignificant such that the operator can operate the machine without changing the engine speed control.

It should be appreciated that in the event that multiple delivery devices or selective control valves are provided, one or more lower priority hydraulic flow deficiencies may arise. The implement priority valve of the present disclosure may be applied to multiple delivery devices at the same time. If necessary to achieve improved flow stability or to prioritize hydraulic fluid delivery among the multiple delivery devices, different spring settings (e.g., a spring setting of the spring element 424) may be employed.

It should be appreciated that incorporation of the priority valve of the present disclosure into the hydraulic circuit (e.g., the circuit 200) may involve, or otherwise be associated with, additional modifications to ensure proper performance over a range of operational conditions. In one example, such incorporation may involve the addition of a counterbalance valve to ensure flow stability under one or more restricted conditions. Of course, in other examples, that incorporation may involve the addition of other suitable devices.

Compared to other configurations in which one function is prioritized and all other functions are restricted, the configuration(s) contemplated by the present disclosure may facilitate equal prioritization of all non-restricted functions when a particular function is restricted. The configuration(s) of the present disclosure may be particularly applicable to implementations in which a single high flow, lower priority function may be restricted to provide flow to other higher priority functions.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. An agricultural implement comprising:
   a fluid source including a pump configured to supply hydraulic fluid;
   a plurality of fluid demand devices each configured to receive hydraulic fluid supplied by the fluid source during operation of the agricultural implement, wherein the plurality of fluid demand devices includes a first fluid demand device having an actuator and a second fluid demand device having a motor;
   a delivery control valve fluidly coupled between the fluid source and the first fluid demand device, wherein the delivery control valve is configured to selectively deliver hydraulic fluid supplied by the fluid source to the first fluid demand device during operation of the agricultural implement; and
   a priority valve fluidly coupled between the delivery control valve and the first fluid demand device, wherein the priority valve is configured to selectively restrict delivery of hydraulic fluid to the first fluid demand device by the delivery control valve to address a hydraulic fluid demand of the second higher priority fluid demand device during operation of the agricultural implement,
   wherein:
   the priority valve includes an inlet fluidly coupled to the delivery control valve, an outlet fluidly coupled to the first fluid demand device, and a spool movable between an open position, in which the inlet and the outlet are fluidly coupled to one another to permit delivery of hydraulic fluid from the delivery control valve to the first fluid demand device, and a closed position, in which the inlet and the outlet are fluidly de-coupled from another to resist delivery of hydraulic fluid from the delivery control valve to the first fluid demand device;

the priority valve includes a first pressure signal port configured to apply a first pressure to a first end of the spool and a second pressure signal port configured to apply a second pressure to a second end of the spool in opposition to the first pressure applied to the first end of the spool;

movement of the spool between the open and closed positions is at least partially dependent on a difference between the first and second pressures; and the priority valve is configured for movement from the open position to the closed position when the difference between the first and second pressures falls below a reference threshold.

2. The agricultural implement of claim 1, wherein the actuator is a hydraulically-operated double-acting cylinder and the second motor is a hydraulically-operated motor.

3. The agricultural implement of claim 1, wherein the first pressure applied at the first pressure signal port is indicative of an operational load and/or a hydraulic fluid demand associated with the second fluid demand device, and wherein the second pressure applied at the second pressure signal port is indicative of an actual pressure supplied to the second fluid demand device.

4. The agricultural implement of claim 1, further comprising a compensator valve fluidly coupled to the second fluid demand device, wherein the compensator valve includes first and second compensator ports that are fluidly coupled to the respective first and second pressure signal ports to at least partially control the difference between the first and second pressures.

5. The agricultural implement of claim 4, further comprising a flow control valve fluidly coupled between the compensator valve and the second fluid demand device.

6. The agricultural implement of claim 5, wherein one of the first and second pressures corresponds to a pressure supplied to an inlet of the compensator valve and the other of the first and second pressures corresponds to a pressure supplied from an outlet of the flow control valve.

7. A hydraulic circuit for an agricultural implement, the hydraulic circuit comprising:

a fluid source including a pump configured to supply hydraulic fluid;

a fluid demand subsystem configured to receive hydraulic fluid supplied by the fluid source during operation of the hydraulic circuit, wherein the fluid demand subsystem includes an actuator;

a delivery control valve fluidly coupled between the fluid source and the fluid demand subsystem, wherein the delivery control valve is configured to selectively deliver hydraulic fluid supplied by the fluid source to the fluid demand subsystem during operation of the hydraulic circuit; and a priority valve fluidly coupled between the delivery control valve and the fluid demand subsystem, wherein the priority valve is configured to selectively restrict delivery of hydraulic fluid to the fluid demand subsystem by the delivery control valve to address a hydraulic fluid demand of another higher priority fluid demand subsystem including a motor during operation of the hydraulic circuit, and wherein the priority valve is configured to selectively restrict delivery of hydraulic fluid to the fluid demand subsystem by the delivery control valve in a proportional manner to optimize performance of the fluid demand subsystem, wherein:

the priority valve includes an inlet fluidly coupled to the delivery control valve, an outlet fluidly coupled to the fluid demand subsystem, and a spool movable between an open position, in which the inlet and the outlet are fluidly coupled to one another to permit delivery of hydraulic fluid from the delivery control valve to the fluid demand subsystem, and a closed position, in which the inlet and the outlet are fluidly de-coupled from another to resist delivery of hydraulic fluid from the delivery control valve to the fluid demand subsystem;

the priority valve includes a first pressure signal port configured to apply a first pressure to a first end of the spool and a second pressure signal port configured to apply a second pressure to a second end of the spool in opposition to the first pressure applied to the first end of the spool;

the first pressure applied at the first pressure signal port is indicative of an operational load and/or a hydraulic fluid demand associated with the another higher priority fluid demand subsystem; and the second pressure applied at the second pressure signal port is indicative of an actual pressure supplied to the another higher priority fluid demand subsystem.

8. The hydraulic circuit of claim 7, wherein the actuator is a hydraulically-operated double-acting cylinder and the motor is a hydraulically-operated motor.

9. The hydraulic circuit of claim 7, wherein the priority valve is configured for movement from the open position to the closed position when the difference between the first and second pressures falls below a reference threshold.

10. The hydraulic circuit of claim 7, further comprising a compensator valve fluidly coupled to the another higher priority fluid demand subsystem, wherein the compensator valve includes first and second compensator ports that are fluidly coupled to the respective first and second pressure signal ports to at least partially control the difference between the first and second pressures.

11. The hydraulic circuit of claim 10, further comprising a flow control valve fluidly coupled between the compensator valve and the another higher priority fluid demand subsystem.

12. A valve system for a hydraulic circuit including a fluid source having a pump, a fluid demand subsystem fluidly coupled to the fluid source that has an actuator, and a delivery control valve fluidly coupled between the fluid source and the fluid demand subsystem and configured to selectively deliver hydraulic fluid supplied by the fluid source to the fluid demand subsystem during operation of the hydraulic circuit, the valve system comprising:

a priority valve including (i) a spool having a first end and a second end arranged opposite the first end, (ii) a first pressure signal port configured to apply a first pressure to the first end of the spool, and (iii) a second pressure signal port configured to apply a second pressure to the second end of the spool in opposition to the first pressure applied to the first end of the spool, and a compensator valve fluidly coupled to another fluid demand subsystem of the hydraulic circuit including a motor, wherein the priority valve is configured to selectively restrict delivery of hydraulic fluid to the fluid demand subsystem by the delivery control valve to address a hydraulic fluid demand of the another higher priority fluid demand subsystem of the hydraulic circuit during operation thereof, wherein the first and second pressures are established with reference to the another higher priority fluid demand subsystem of the hydraulic circuit, and wherein the compensator valve includes first and second compensator ports that are fluidly coupled to the respective first and second pressure signal ports to at least partially control a difference between the first and second pressures.

13. The priority valve system of claim 12, wherein the first pressure applied at the first pressure signal port is indicative of an operational load and/or a hydraulic fluid demand associated with the another higher priority fluid demand subsystem, and wherein the second pressure applied at the second pressure signal port is indicative of an actual pressure supplied to the another higher priority fluid demand subsystem.

14. The valve system of claim 12, wherein the priority valve is configured for movement from an open position, in which an inlet of the priority valve and an outlet of the priority valve are fluidly coupled to one another to permit delivery of hydraulic fluid from the delivery control valve to the fluid demand subsystem during operation of the hydraulic circuit, to a closed position, in which the inlet and the outlet are fluidly de-coupled from another to resist delivery of hydraulic fluid from the delivery control valve to the fluid demand subsystem during operation of the hydraulic circuit, when the difference between the first and second pressures falls below a reference threshold.

15. The valve system of claim 12, wherein the priority valve is configured to selectively restrict delivery of hydraulic fluid to the fluid demand subsystem by the delivery control valve in a proportional manner to optimize performance of the fluid demand subsystem during operation of the hydraulic circuit.

* * * * *